United States Patent [19]
Crutcher et al.

[11] Patent Number: 5,986,656
[45] Date of Patent: *Nov. 16, 1999

[54] GRAPHICAL USER INTERFACE CONTROL ELEMENT

[75] Inventors: Paul D. Crutcher, Aloha; Rune A. Skarbo, Hillsboro, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/115,028

[22] Filed: Jul. 14, 1998

Related U.S. Application Data

[63] Continuation of application No. 08/536,811, Sep. 29, 1995, Pat. No. 5,844,560.

[51] Int. Cl.[6] .................................. G06F 9/00; G06F 3/14
[52] U.S. Cl. ........................... 345/355; 345/354; 345/976
[58] Field of Search ..................................... 345/158, 135, 345/418, 339, 340, 341, 347, 355, 358, 348, 349, 354, 356, 976, 977

[56] References Cited

U.S. PATENT DOCUMENTS

| | | | |
|---|---|---|---|
| 5,574,845 | 11/1996 | Benson et al. | 345/418 |
| 5,594,469 | 1/1997 | Freeman et al. | 245/158 |
| 5,844,560 | 12/1998 | Crutcher et al. | 345/354 |

*Primary Examiner*—Raymond J. Bayerl
*Assistant Examiner*—Cao H. Nguyen
*Attorney, Agent, or Firm*—William H. Murray; N. Stephan Kinsella

[57] ABSTRACT

A graphical user interface control element. A computer system for interfacing with a user has a display device and a user input peripheral device for controlling a positioning element on the display device. The positioning element has a location and an active status corresponding to whether the positioning element is activated or not activated by the user. A control button is displayed on the display means, the control button having a three-dimensional appearance and at least first and second regions. The active status and location of the positioning element are monitored to determine whether a region of the control button is being pushed by the positioning device. The appearance of the control button on the display means is altered in accordance with the region being pushed by the positioning device so that the control button appears to be tilted toward the pushed region by the positioning device to provide graphical feedback to the user. A signal is generated in accordance with which region being pushed by the positioning device.

30 Claims, 5 Drawing Sheets

GRAPHICAL USER INTERFACE CONTROL ELEMENT

CROSS-REFERENCE TO RELATED APPLICATION

This application is a continuation of application Ser. No. 08/536,811 filed on Sep. 29, 1995, now issued as U.S. Pat. No. 5,844,560.

BACKGROUND OF THE INVENTION

1. Field of the Invention

The present invention relates to computer interfaces and, in particular, to graphical user interface control elements and methods for their implementation.

2. Description of the Related Art

In current computer systems, graphical user interfaces are often utilized to provide for user control, input, and interaction with the computer system. For example, in the Microsoft® Windows™ environment, a user typically utilizes a peripheral device such as a mouse to move a mouse pointer across the display on the monitor. When the mouse pointer is positioned over a relevant feature or window, the user can click the mouse to activate the feature or to input a choice or data, such as to indicate "okay," "yes," "no," and the like.

In current usage, a variety of types of control windows are utilized to allow user input and control of an application program running on the computer system. A "button" is a type of window that is configured to allow user control when the mouse pointer is clicked when lying thereover. For example, to change the volume of a speaker of the computer system, two separate window buttons may be utilized, one to increase the volume and another to decrease the volume. Thus, two such buttons may be used to adjust the value of a continuous-value parameter such as volume which may be either increased or decreased. The buttons may be located near each other on the display screen and have arrows pointing in opposing directions to serve as a graphical indication to the user as to which button will decrease or increase the volume level of the speaker. An accompanying indicator may graphically show the current volume level.

One problem with such prior art graphical user interface control elements is that two separate buttons often occupy too much space on the display, or more space than a single button would require. In addition, the two buttons are not unified to provide integrated graphical feedback to the user. When one button is depressed, its image may change so that it appears as if it is physically depressed, but the other button is unaffected. Further, providing two or more buttons to control a continuous-value parameter may require more system resources and complexity than that associated with a single button.

A "slider control" is also sometimes used to allow users to control parameters such as volume. Such slider controls resemble, for example, a control handle or knob situated at some location along a horizontal track which may be dragged left or right by the mouse pointer to decrease or increase the relevant parameter. However, such slider controls also require a relatively large amount of display space and are limited in the way that graphical feedback is given to the user. If the slider control or multiple buttons are reduced in size to minimize display space utilized, usability problems may be encountered as the user may find it difficult to see or control the control element.

There is thus a need for improved single-button, integrated graphical user interface control elements which provide graphical feedback information to the user.

SUMMARY

There is provided herein a graphical user interface control element and method. According to a preferred embodiment of the invention, a computer system for interfacing with a user comprises a display device and a user input peripheral device for controlling a positioning element on the display device. The positioning element has a location and an active status corresponding to whether the positioning element is activated or not activated by the user. A control button is displayed on the display means, the control button having a three-dimensional appearance and at least first and second regions. The active status and location of the positioning element are monitored to determine whether a region of the control button is being pushed by the positioning device. The appearance of the control button on the display means is altered in accordance with the region being pushed by the positioning device so that the control button appears to be physically pushed by the positioning device to provide graphical feedback to the user. A signal is generated in accordance with which region being pushed by the positioning device.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

System Hardware

Figure 1:
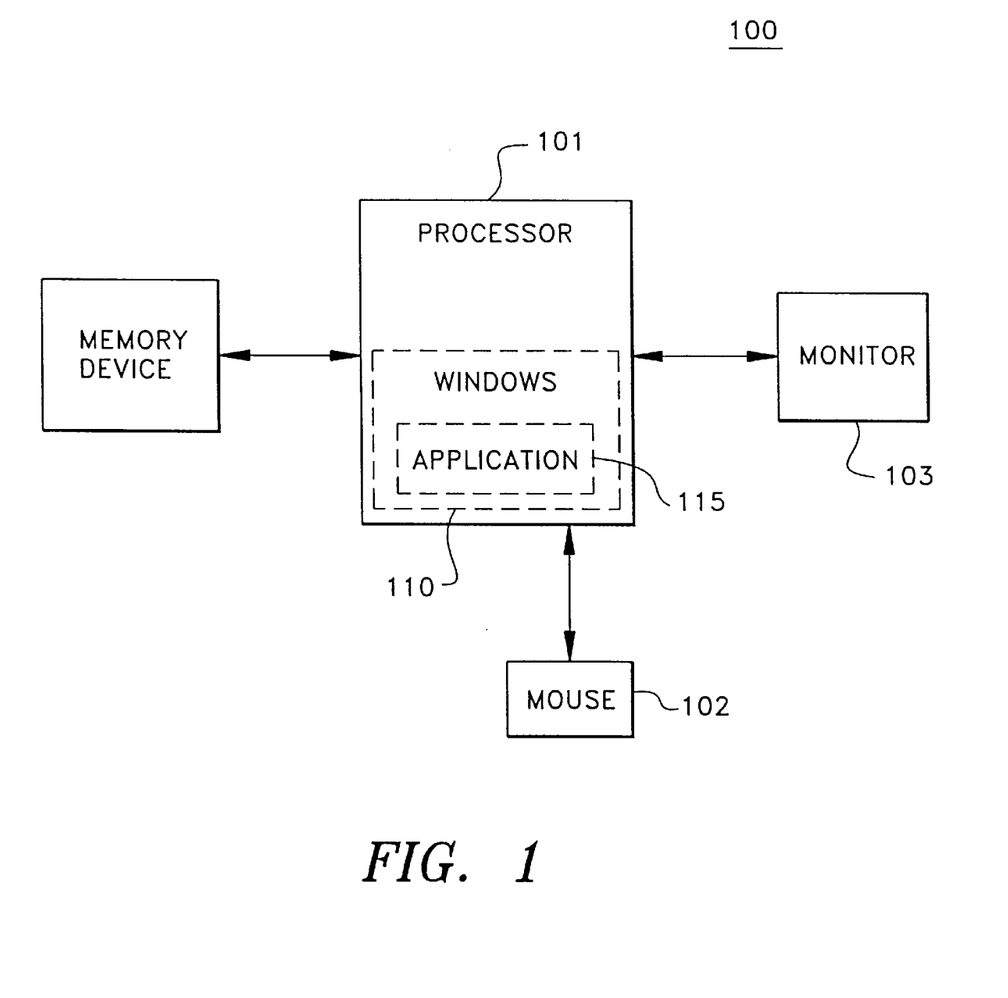
FIG. 1 shows a computer system in accordance with a preferred embodiment of the present invention.

Referring now to FIG. 1, there is shown computer system 100 in accordance with a preferred embodiment of the present invention. Computer system 100 comprises a processor 101, mouse 102, memory device 104, and monitor 103. Processor 101 is a general-purpose programmable processor, preferably an Intel® Pentium® processor, having an operating system such as Windows operating system 110, and running an application program such as application 115, which may be, for example, a video conferencing application. Processor 101 provides information which is graphically displayed on monitor 107, such as displays containing video and other windows. A user can move and control a pointer or similar graphical positioning device around the display displayed on monitor 107 via a user input peripheral such as mouse 102. As will be appreciated, other peripherals, such as a roller ball or joystick-like apparatus, may be utilized instead of mouse 102. Memory device 104 is any memory device suitable for storage of information, such as a hard-disk drive, floppy disk drive, or compact disk read-only-memory (CD-ROM) drive.

As will be understood, the present invention can be embodied in the form of computerimplemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

Rocker Button User Interface Control Element

In a preferred embodiment of the present invention, a "rocker button" is provided to allow flexible user control with graphical feedback. Unlike prior art buttons in which two or more buttons are used for such interfacing, the present rocker button invention is a single, integrated button that allows control of one or more continuous-value parameters via mouse 102.

Figure 2:
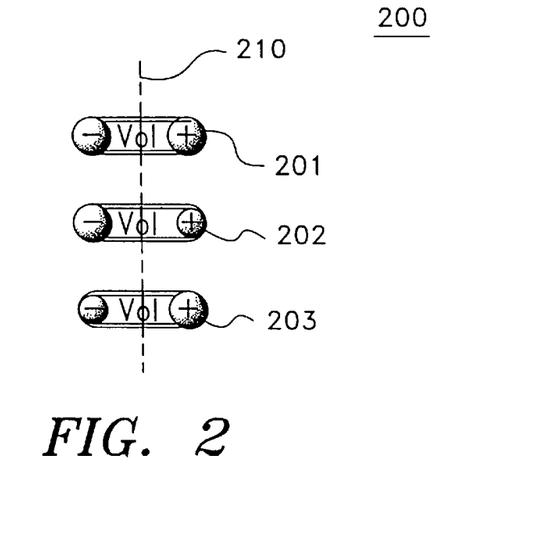
FIG. 2 shows a rocker button control element in accordance with a preferred embodiment of the present invention.

Referring now to FIG. 2, there is shown a rocker button control element 200 in accordance with a preferred embodiment of the present invention. Rocker button 200 is illustrated in FIG. 2 in three states: unpressed state 201, pressed positive state 202, and pressed negative state 203. The "+" and "−" regions of rocker button 200 represent regions of rocker button 200 that may be clicked to increase or decrease, respectively, any of several types of parameters, such as volume, size of a window, and the like. As illustrated, the label "vol" in FIG. 2 indicates rocker button 200 is designed to lower or raise the volume of a speaker (not shown) of computer system 100. Rocker button 200 in a preferred embodiment is illustrated in plan view, i.e. from above, in order for a user to utilize the mouse pointer to "push down" on a part or region of the button.

In a preferred embodiment, rocker button 200 is a single button (i.e., window), so that it can be flexibly configured to more usefully accept user input from a device such as mouse 102. When a user holds down the mouse input button, rocker button 200 remains activated or selected even if the mouse pointer is moved around within the boundaries of rocker button 200. Rocker button 201 can also be controlled in different ways as the mouse pointer, while remaining clicked or depressed, is moved to different spatial regions within the boundaries of rocker button 200. In this application, when the mouse button is depressed (i.e. "clicked") while the mouse pointer is lying over rocker button 200, rocker button is considered to be "pushed."

In a preferred embodiment as illustrated in FIG. 2, rocker button 200 can be unpressed, pressed positive, or pressed negative, each state appearing differently on the display on monitor 103 to look as if rocker button 200 is a physical rocker button which is actually depressed by the user, thereby providing useful visual or graphical feedback to the user. Thus, rocker button 200 in unpressed state 200 appears to the user to be unpressed when the pointer of mouse 102 is not being clicked. When the mouse pointer (not shown) is located over the right half of rocker button 200 and is clicked (i.e. the mouse button is held down by the user), rocker button 200 is displayed in pressed positive state 202 as long as mouse 102 remains clicked and the mouse pointer is still within the right half of rocker button 200. Additionally, during pressed positive state 202, a "+" message is continuously generated for use by the parent window of rocker button 200, which is implemented in processor 101, for example to linearly increase the volume as long as rocker button 200 is in pressed positive state 202. As will be understood, pressed negative state 203 of rocker button 200 operates similarly to generate a "−" message and to provide graphical feedback that this end of rocker button 200 is depressed.

The right and left halves of rocker button 200 are divided by boundary 210 illustrated in FIG. 2. When the mouse button is continuously depressed, then as the user causes the mouse pointer to move across different regions of rocker button 200, i.e. across boundary 210, rocker button 200 switches from pressed positive state 202 to pressed negative state 203, and vice-versa. The pressed positive and pressed negative states of the rocker button are designed such that the user receives graphical feedback which makes the button appear as if it were physically depressed to the left or right. As will be appreciated by those skilled in the art, such a button may be displayed graphically in various pressed or unpressed states. Thus, to the user, rocker button 200 has the appearance of a physical button which may be physically depressed one way or the other, or not at all, to generate a "−" or "+" message, and the rocker button rocks left or right when it is depressed in accordance with the position of a clicked mouse pointer moving across the button. Thus, as illustrated in FIG. 2, the "+" and related features become relatively smaller in pressed positive state 202 to indicate that the "+" pad has been pressed down, to give the rocking appearance to a user. This feedback is useful to a user in providing "tactile" and graphical feedback so that computer-implemented rocker button 200 has the "look and feel" of a three-dimensional, solid rocker button which may be depressed in a manner similar to such a physical button, and with similar effects (i.e. generating a signal or message in accordance with the portion of the button pushed).

As described, the boundary within rocker button 200 which distinguishes between "−" and "+" regions of rocker button 200 is preferably a vertical boundary centered horizontally on rocker button 200 such as boundary 210. However, as will be understood, in alternative preferred embodiments, rocker button 200 need not be symmetrical, and the "+" and "−" regions need not be of equal size or shape. Further, as will be understood, more than two regions and corresponding pressed states may be provided in various button configurations. Therefore, as will be appreciated by those skilled in the art, the present embodiment of the present invention may be extended to support any number of regions and corresponding button notifications 30 (wherein a button notification is a message such as "−" or "+" generated and transmitted to the button's parent window). For example, a button configured with five separate regions may be provided, as discussed in further detail below with reference to FIG. 5.

Alternatively, a more or less "continuous" button may also be provided, where each movement of a clicked mouse pointer gradually changes the depressed state of the button. For example, rocker button 200 may be provided with a continuum or range of depressed states, so that a clicked mouse pointer located precisely at the horizontal center of rocker button 200, i.e. along boundary 210, does not cause rocker button to tilt left or right at all, just as if a user physically depressed at the center of a physical rocker button. As a clicked mouse pointer moves farther left, towards the "−" end of rocker button 200, for example, the button becomes more and more depressed, both graphically and in the sense of generating more and more intense "−" signals or notification messages transmitted to rocker button 200's parent window. This can be used to provide for a rocker-type button which allows a user to push "harder" on the button (by placing a clicked mouse pointer on different portions of the rocker button, such as closer to the end) or softer, a feature not available on current mouse-type input devices having only on or off input buttons.

As will be appreciated, in alternative preferred embodiments, a rocker type button may also be configured to react to single-, double-, and continuous-clicked mouse 102 pointer input. Thus a continuous click on mouse 102 in the "−" region of rocker button 200 may cause a brief depression of the "−" side of rocker button 201, and a corresponding brief pressed negative state 203 of rocker button 201. A continuously clicked or depressed mouse button may cause pressed negative state 203 until the mouse button is released, as described hereinabove, and a double-click of the mouse button may cause a temporary pressed negative state 203 which is longer than and/or of more intensity than that caused by a single-click.

Thus, the present invention provides a means for adjusting the value of one or more parameters with a single button where previously multiple buttons or slider controls were required. Thus, for example, rocker button 200 is a single button that notifies its parent window of both positive and negative type clicks to control the "volume" parameter, in contrast to prior art buttons that merely produce click notification.

Figure 3:
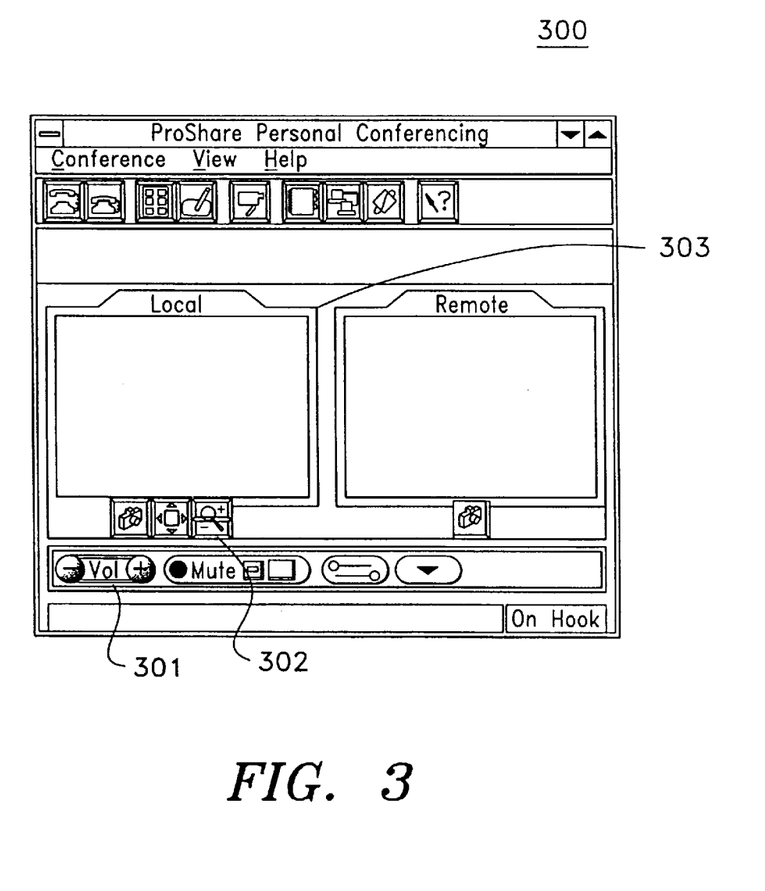
FIG. 3 shows a display screen of a video conferencing application utilizing a rocker button in accordance with the present invention.

Referring now to FIG. 3, there is shown a display screen of a video conferencing application utilizing a rocker button in accordance with the present invention. As will be understood, rocker button 301, configured as hereinabove described with respect to rocker button 201 of FIG. 2, may be utilized by a user to increase or decrease the volume of the speaker broadcasting sound associated with the current video conference session.

Figure 4:
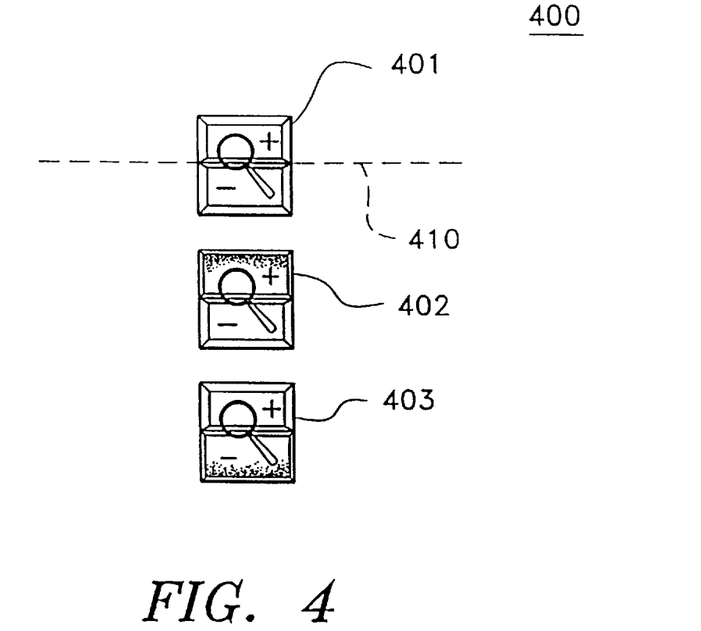
FIG. 4 shows an alternative preferred rocker button in accordance with the present invention.

Referring now to FIG. 4, there is shown an alternative preferred rocker button 400 in accordance with the present invention. As will be understood, rocker button 400 is illustrated in unpressed state 401, pressed positive state 402, and pressed negative state 403. Rocker button 400 operates similarly to rocker button 200, and is divided by boundary 410 into "+" and "−" regions. Rocker button 400 may be utilized to increase or decrease the zoom or image magnification of a selected video image or graphic, for example. Referring once more to FIG. 3, rocker button 302 may be utilized in a video conference to zoom in or out on the video displayed in "local" window 303.

Figure 5:
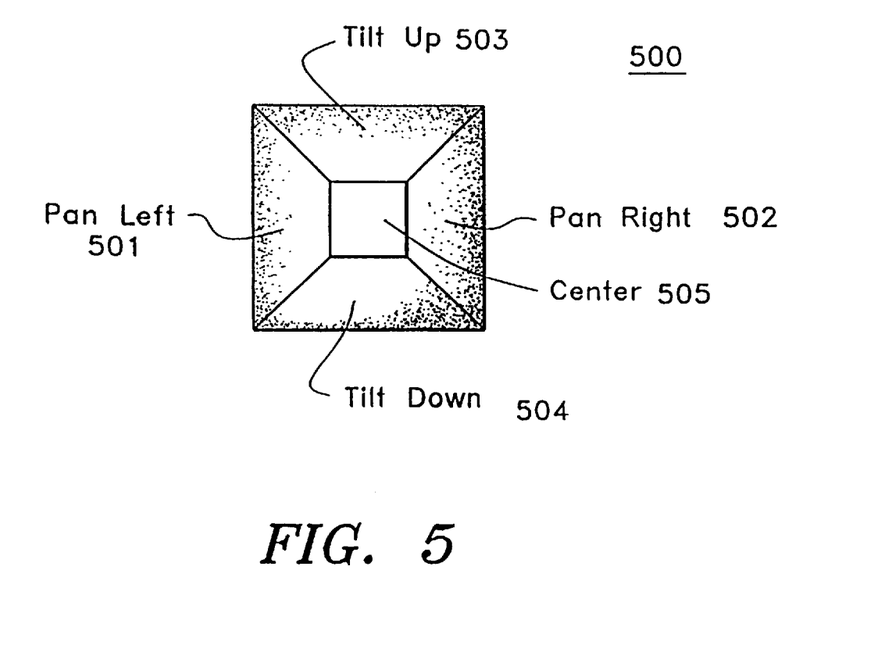
FIG. 5 depicts a five-region rocker button for controlling video pan and tilt parameters, in accordance with an alternative preferred embodiment of the present invention.

As describe hereinabove, a rocker button may also be configured to with a plurality of regions to allow multidimensional control of a continuous-value parameter or related set of parameters. Referring now to FIG. 5, there is shown a five-region rocker button 500 for controlling video pan and tilt parameters, in accordance with an alternative preferred embodiment of the present invention. Region 501 represents pan left, region 502 represents pan right, region 503 represents tilt up, region 504 represents tilt down, and region 505 represents center. As will be appreciated, these related parameters may be utilized to control the movement of a camera which generates video signals. As a clicked mouse pointer is moved around rocker button 500 from region to region, the appropriate signal is generated for the parent window of rocker button 500, and rocker button changes appearance accordingly to appear as if it physically rocks toward the region depressed. As will be appreciated by those skilled in the art, in alternative preferred embodiments of rocker button 500, different levels of granularity or sensitivity may be configured into rocker button 500.

Rocker Button Implementation

Figure 6:
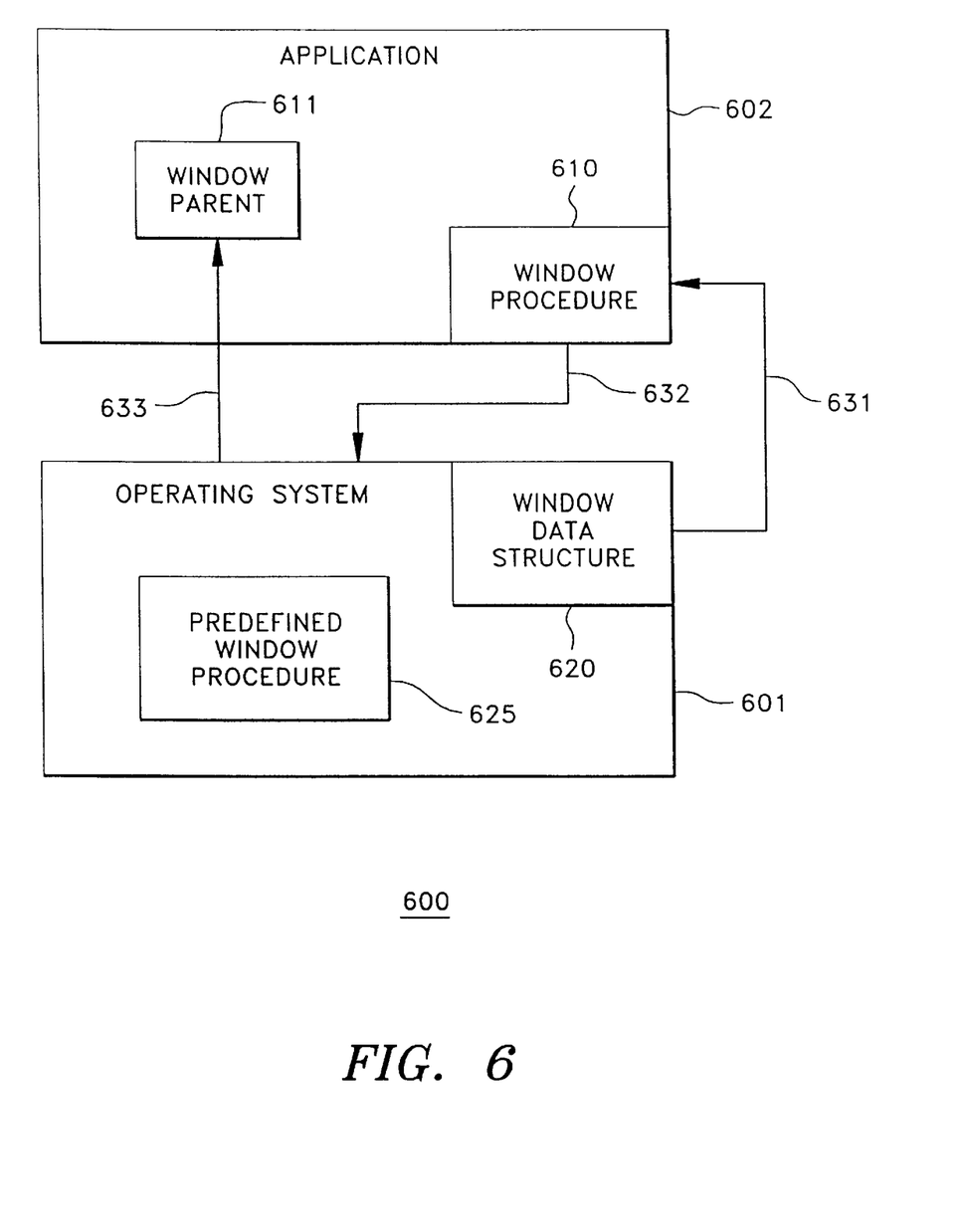
FIG. 6 is a software system for implementing the rocker button of FIG. 2, in accordance with a preferred embodiment of the present invention.

In a preferred embodiment of the present invention, a rocker button as described hereinabove is implemented in the following described manner. Referring now to FIG. 6, there is shown software system 600 for implementing rocker button 200 of FIG. 2. As will be understood, the elements of software system 600 represent applications running on a processor such as processor 101 of computer system 100. Software system 600 comprises operating system 601 and application 602. In a preferred embodiment, operating system 601 is a windows-based graphical operating system such as Microsoft Windows. Application 602 may be any application requiring user interfacing and control, such as a video conferencing application. Operating system 601 comprises a window data structure 620 which corresponds to rocker button 200, which is a type of window. Window data structure 620 contains a pointer to the window procedure that controls the rocker button, i.e. window procedure 610. Application 610 comprises window procedure 610 and window parent 611, which also correspond to rocker button 200.

As will be understood by those skilled in the art, button windows such as rocker button 200 correspond to a particular windows procedure that is called by operating system 601 to communicate messages in response to user input with a peripheral device such as mouse 102. Operating system 601 also has a group of predefined or built-in controls (not shown). In a preferred embodiment of the present invention, the technique of subclassing is utilized so that operating system 601 refers to a customized window procedure such as window procedure 610, instead of a default, predefined type of window procedure such as default window procedure 625.

When a user causes a mouse pointer to be situated over a region of rocker button 200 and clicks the mouse (either a brief click or more continuous click), message 631 is transmitted by window data structure 620 to window procedure 610 to indicate that a mouse click event has occurred related to the region of rocker button 200. Window data structure thus communicates events such as the message "rocker button 200 pushed" to window procedure 610. Window procedure 610 sends message 632 in response thereto to various facilities of operating system 601 (such as a mouse driver) to "capture mouse," i.e. to determine information such as which portion of rocker button 200 was pushed. Window procedure 610 also defines the range of rocker button 200, and also controls the redrawing of rocker button 200 in its various pressed or unpressed states 201, 202, 203.

Window procedure also determines the value to be generated in accordance with the region of rocker button 200 pushed by the user, e.g. whether "+" or "−", and transmits a message via message 633 to window parent 611. As will be understood, window parent 611 is considered to "own" rocker button 200, and determines what to do with the message received, for example whether to increase or decrease volume in response to the receipt of a "+" or "−" message. For example, in response to a user holding down the mouse button while the pointer is in the "+" region of rocker button 200, a "button_down" message 631 is transmitted to window procedure 610. Window procedure 610 captures the mouse via message 632, and determines which portion of rocker button 200 was pushed. It then redraws rocker button 200 in pressed positive state 202 for as long as a "+" is received.

As a mouse button is held down while the mouse pointer is over some region of rocker button 200, a succession of "+"'s or "−"'s is thus transmitted to parent window 611. Window procedure 610 also determines when a boundary such as boundary 210 between relevant regions of rocker button 200 is crossed while rocker button 200 is still being pushed, and changes the message accordingly from a stream of "+"'s to "−"'s or vice-versa, and also changes appearance of rocker button 200 accordingly, so that it rocks back and forth as a "pushed" mouse pointer is moved back and forth across boundary 210. Thus, as a pushed mouse pointer moves out of one subregion of rocker button 200 and into another one, rocker button 200 remains in a "pushed" state, although its appearance and message transmitted to parent window 611 changes in accordance with the region of the rocker button currently being pushed.

Those skilled in the art will appreciate from the foregoing description how to configure operating system 601 and application 602 to provide messages, commands, and the like to provide the foregoing implementation of rocker button 200.

Figure 7:
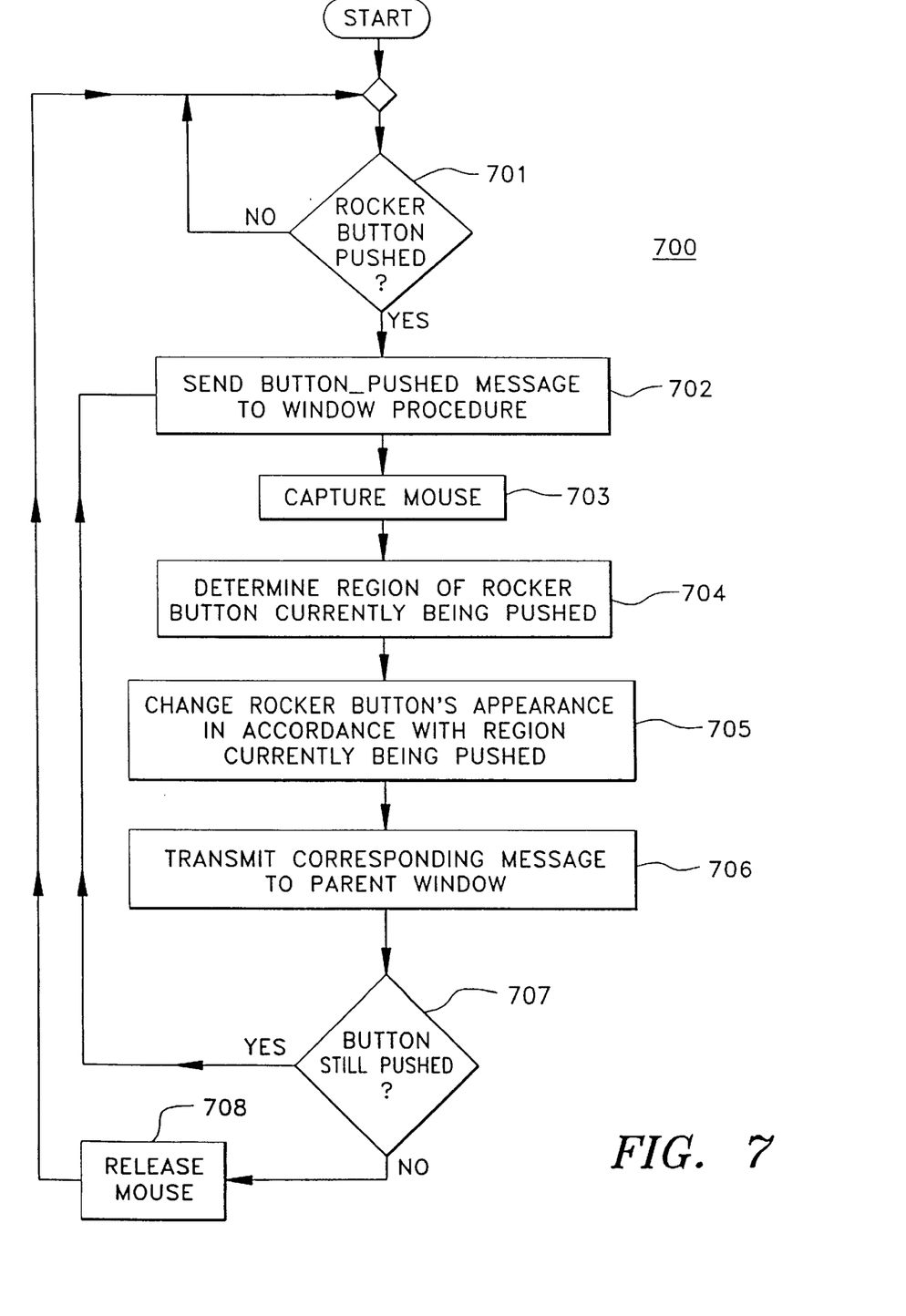
FIG. 7 is a flow chart illustrating the method of operation of the software system of FIG. 6, in accordance with a preferred embodiment of the present invention.

Referring now to FIG. 7, there is shown a flow chart 700 illustrating the method of operation of software system 600 of FIG. 6, in accordance with a preferred embodiment of the present invention. As illustrated in step 701, when rocker button 200 is pushed, window data structure 620 sends a button_pushed message to window procedure 610 (step 702). Window procedure 610 then sends a capture mouse message (step 703) to obtain information concerning where the mouse pointer was located when pushed (i.e. clicked). Window procedure 610 then determines the region of rocker button 200 currently being pushed, i.e. whether the "−" or "+" region is being pushed (step 704). Window procedure 610 then alters the appearance of rocker button 200 in accordance with the region being pushed (step 705), as described in further detail hereinabove, and also generates the appropriate message to be transmitted to parent window 611 (step 706). As long as rocker button 200 is still being pushed, the foregoing steps of determining which region is being pushed, redrawing rocker button 200, and generating the appropriate message are repeated (step 707). When rocker button 200 is released, the mouse is released (step 708) and the present invention returns to a state waiting for the rocker button to be pushed again (steps 707, 701).

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer system for interfacing with a user, comprising:
   (a) display means;
   (b) user input means for controlling a positioning element on the display means, the positioning element having a location and an active status corresponding to whether the positioning element is activated or not activated by the user;
   (c) means for displaying a single, integrated control button on the display means, wherein the control button is implemented as a window owned by a parent window that determines how to respond to messages transmitted to the parent window from the control button, the control button having a solid, three-dimensional appearance and at least first and second regions, wherein each region corresponds to one of at least first and second button messages, respectively;
   (d) means for monitoring the active status and location of the positioning element to determine whether a region of the control button is being pushed by the positioning device;
   (e) means for rocking the control button towards the region being pushed by the positioning device by altering the solid, three-dimensional appearance of the control button on the display means in accordance with the region being pushed by the positioning device so that the control button appears to be tilted toward the pushed region by the positioning device while the pushed region is pushed by the positioning device, wherein rocking the control button does not comprise depressing the entire control button or moving the control button laterally across the display means;
   (f) means for generating a message of the at least first and second messages in accordance with which region is being pushed by the positioning device; and
   (g) means for transmitting the generated message to the window parent while the corresponding pushed region is pushed by the positioning device.

2. The computer system of claim 1, wherein the control button is presented from a plan view on the display means.

3. The computer system of claim 1, further comprising a processor running an operating system and an application, the application maintaining a window procedure for controlling the appearance of the control button.

4. The computer system of claim 3, wherein the application is a video conferencing application.

5. The computer system of claim 1, the user input means comprising a mouse having a mouse button.

6. The computer system of claim 1, wherein the control button is a rocker button.

7. The computer system of claim 5, wherein the rocker button has first and second regions only, wherein the first and second regions are for adjusting the value of a parameter in accordance with the region pushed.

8. The computer system of claim 7, wherein the first region is a positive region corresponding to an increase of the parameter and the second region is a negative region corresponding to a decrease in the parameter.

9. The computer system of claim 8, wherein:
   the rocker button appears to be tilted toward the positive region and the parameter is increased while the positive region is pushed by the positioning element; and
   the rocker button appears to be tilted toward the negative region and the parameter is decreased while the negative region is pushed by the positioning element.

10. The computer system of claim 1, wherein the control button comprises a plurality of regions.

11. A method for interfacing with a user of a computer system comprising a display means, the method comprising the steps of:
   (a) controlling a positioning element on the display means with a user input means, the positioning element having a location and an active status corresponding to whether the positioning element is activated or not activated by the user;
   (b) displaying a single, integrated control button on the display means, wherein the control button is implemented as a window owned by a parent window that determines how to respond to messages transmitted to the parent window from the control button, the control button having a solid, three-dimensional appearance and at least first and second regions, wherein each region corresponds to one of at least first and second button messages, respectively;

(c) monitoring the active status and location of the positioning element to determine whether a region of the control button is being pushed by the positioning device;

(d) rocking the control button towards the region being pushed by the positioning device by altering the solid, three-dimensional appearance of the control button on the display means in accordance with the region being pushed by the positioning device so that the control button appears to be tilted toward the pushed region by the positioning device while the pushed region is pushed by the positioning device, wherein rocking the control button does not comprise depressing the entire control button or moving the control button laterally across the display means;

(e) generating a message of the at least first and second messages in accordance with which region is being pushed by the positioning device; and (f) transmitting the generated message to the window parent while the corresponding pushed region is pushed by the positioning device.

12. The method of claim 11, wherein the control button is presented from a plan view on the display means.

13. The method of claim 11, further comprising the step of running an operating system and an application with a processor of the computer system, the application maintaining a window procedure for controlling the appearance of the control button.

14. The method of claim 13, wherein the application is a video conferencing application.

15. The method of claim 11, the user input means comprising a mouse having a mouse button.

16. The method of claim 11, wherein the control button is a rocker button.

17. The method of claim 16, wherein the rocker button has first and second regions only, wherein the first and second regions are for adjusting the value of a parameter in accordance with the region pushed.

18. The method of claim 17, wherein the first region is a positive region corresponding to an increase of the parameter and the second region is a negative region corresponding to a decrease in the parameter.

19. The method of claim 18, wherein:

the rocker button appears to be tilted toward the positive region and the parameter is increased while the positive region is pushed by the positioning element; and the rocker button appears to be tilted toward the negative region and the parameter is decreased while the negative region is pushed by the positioning element.

20. The method of claim 11, wherein the control button comprises a plurality of regions.

21. A storage medium having stored thereon a plurality of instructions for interfacing with a user of a computer system comprising a display means and a processor, wherein the plurality of instructions, when executed by the processor, cause the processor to perform the steps of:

(a) controlling a positioning element on the display means in response to user input from a user input means, the positioning element having a location and an active status corresponding to whether the positioning element is activated or not activated by the user;

(b) displaying a single, integrated control button on the display means, wherein the control button is implemented as a window owned by a parent window that determines how to respond to messages transmitted to the parent window from the control button, the control button having a solid, three-dimensional appearance and at least first and second regions, wherein each region corresponds to one of at least first and second button messages, respectively;

(c) monitoring the active status and location of the positioning element to determine whether a region of the control button is being pushed by the positioning device;

(d) rocking the control button towards the region being pushed by the positioning device by altering the solid, three-dimensional appearance of the control button on the display means in accordance with the region being pushed by the positioning device so that the control button appears to be tilted toward the pushed region by the positioning device while the pushed region is pushed by the positioning device, wherein rocking the control button does not comprise depressing the entire control button or moving the control button laterally across the display means;

(e) generating a message of the at least first and second messages in accordance with which region is being pushed by the positioning device; and (f) transmitting the generated message to the window parent while the corresponding pushed region is pushed by the positioning device.

22. The storage medium of claim 21, wherein the control button is presented from a plan view on the display means.

23. The storage medium of claim 21, wherein the computer system runs an operating system and an application with the processor; wherein the plurality of instructions cause the processor to perform the further step of maintaining with the application, a window procedure for controlling the appearance of the control button.

24. The storage medium of claim 23, wherein the application is a video conferencing application.

25. The storage medium of claim 21, the user input means comprising a mouse having a mouse button.

26. The storage medium of claim 21, wherein the control button is a rocker button.

27. The storage medium of claim 26, wherein the rocker button has first and second regions only, wherein the first and second regions are for adjusting the value of a parameter in accordance with the region pushed.

28. The storage medium of claim 27, wherein the first region is a positive region corresponding to an increase of the parameter and the second region is a negative region corresponding to a decrease in the parameter.

29. The storage medium of claim 28, wherein:

the rocker button appears to be tilted toward the positive region and the parameter is increased while the positive region is pushed by the positioning element; and the rocker button appears to be tilted toward the negative region and the parameter is decreased while the negative region is pushed by the positioning element.

30. The storage medium of claim 21, wherein the control button comprises a plurality of regions.

* * * * *